(No Model.) 2 Sheets—Sheet 1.
J. RIDGE.
SPRING TIRE FOR VEHICLE WHEELS.
No. 573,920. Patented Dec. 29, 1896.
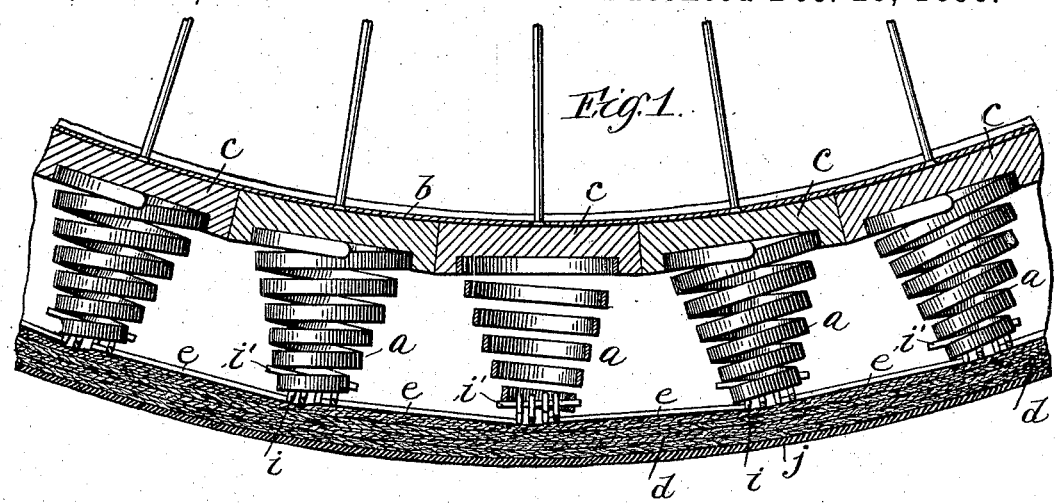
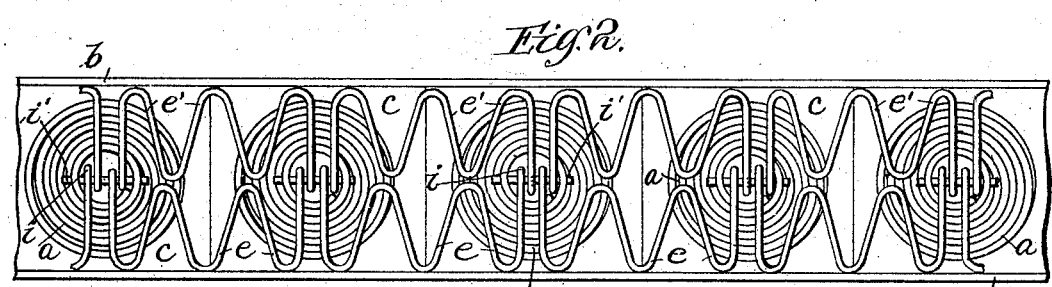
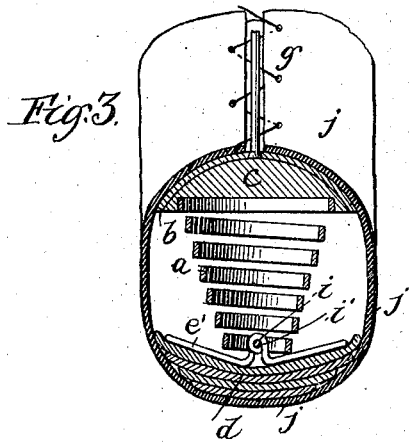
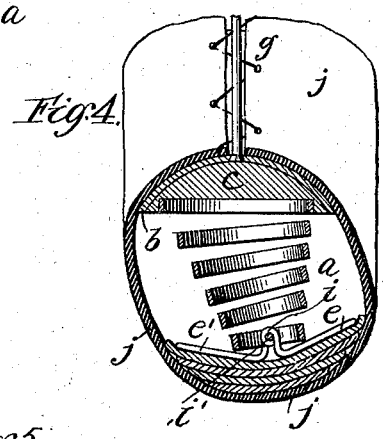
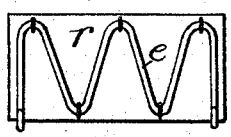
Witnesses.
Wm. M. Rheem
Wm. J. Henning
Inventor
Joseph Ridge (No Model.) 2 Sheets—Sheet 2.
J. RIDGE.
SPRING TIRE FOR VEHICLE WHEELS.
No. 573,920. Patented Dec. 29, 1896.
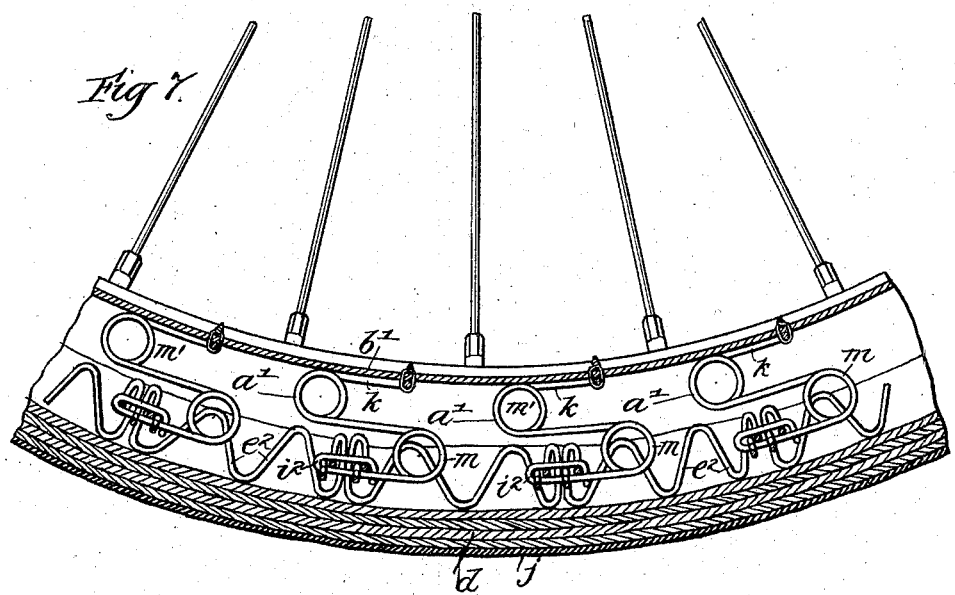
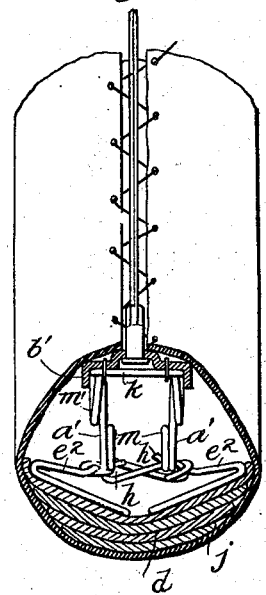
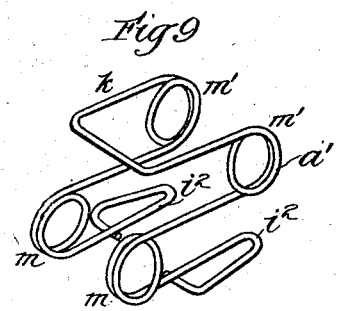
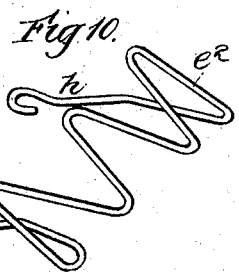
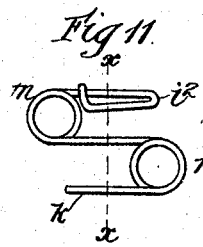
Witnesses
Inventor
Joseph Ridge

UNITED STATES PATENT OFFICE.

JOSEPH RIDGE, OF CHICAGO, ILLINOIS.

SPRING-TIRE FOR VEHICLE-WHEELS.

SPECIFICATION forming part of Letters Patent No. 573,920, dated December 29, 1896.

Application filed October 16, 1893. Serial No. 488,238. (No model.)

*To all whom it may concern:*

Be it known that I, JOSEPH RIDGE, of Chicago, county of Cook, and State of Illinois, have invented certain new and useful Improvements in Spring-Tires for Vehicle-Wheels, of which the following is a full and complete specification, reference being had to the accompanying drawings, in which—

Figure 1 is a peripheral portion of a wheel in vertical section, showing springs in elevation, excepting the middle one, which is in section. Fig. 2 is a plan view with outer casing removed. Figs. 3 and 4 are transverse sections of the tire structure and rim of the wheel. Figs. 5 and 6 are detail views. Fig. 7 corresponds as a view to Fig. 1, but shows a modification of spring structure. Fig. 8 is a transverse section showing the springs and rim of the same constructed as in Fig. 7. Fig. 9 shows one of the springs' modification. Fig. 10 also shows a portion of the same spring structure. Fig. 11 is the same as Fig. 9 in elevation and reversed.

My invention relates to a construction and application of springs for resilient or cushion tire structure wherein the normal cushioning action of said spring is radial of the wheel, and a further provision of such elastic or yielding connection of the spring structure at its peripheral or outer portion is made as will permit the radial action aforesaid.

For my purpose I preferably use coiled springs $a$, so placed upon the rim that their longitudinal axes are radial. In the present example I use the concave rim, the same as used for pneumatic tire, and to furnish a seat for the spiral spring I use wooden blocks or sections $c$, secured in the concavity of the rim by cement or in any convenient manner. In these blocks, as obvious from the drawings, recesses are provided as seats for the spring-base.

In Fig. 2 the form of the elastic connections $e$ $e'$ is shown. They are of spring-wire in pairs, joining the apex of one spring with that of an adjacent one throughout the series. The elastic connections, as I show in this presentation of the invention, are of spring-wire, serpentine in shape, thus with a minimum of weight furnishing breadth for the tread of the wheel. The means of fastening the elastic connections to the springs that I have selected in the present example is by forming loops or eyes $i$ at each end, as shown in Fig. 6. These ends are inserted within the apexes of springs $a$, which latter are provided with apertures and pins $i'$, inserted through, as evident from the drawings, thus securing the connections.

In Fig. 11 a modification is shown in which that portion between the end extensions is made more prominent radially of the wheel and thereby affording a cushioning property independent of the springs $a$. To form a suitable bearing-surface or tread for the wheel, a covering of rubber $j$ is brought around the springs and rim and secured on the inner surface of the latter by lacing, as shown at $g$, or in any suitable manner. Between the rubber casing and elastic connections $e$ $e'$ is interposed a layer or layers of felt $d$, drawn taut circumferentially and is secured in position either by fastening to the elastic connections, to the casing, or to both.

In the views, Figs. 7 to 11, inclusive, the modification shows, besides the difference in form of springs, the adaptability thereto of the other parts. One of these springs is shown in perspective in Fig. 9 and is lettered $a'$. In this view the spring is shown inverted, or in the position it occupies when at the base of the wheel, as are those in Figs. 7 and 8. In Fig. 11 it is shown as at the top of the wheel and in side elevation. With this spring I use a rim $b'$, that is flanged at its sides, and into the channel thus formed the feet $k$ of the springs are seated and secured by staples through the rim or in any suitable manner, the outer springs of which, $e^2$, (Fig. 10 is an example shown in perspective,) bear the same relation to springs $a'$ as in the former illustration of springs $a$ and connections $e$ $e'$. The manner of securing the outer springs is, however, necessarily different. The springs $a'$ are provided with loops $i^2$ at their outer portions to serve as a means of fastening. The springs $e^2$ have their end terminals, which are hook-shaped at the extremities, elongated sufficiently and are so shaped as to be inserted downward through the loop $i^2$ of one side and hooked to the opposite one in pairs or from opposite sides, as indicated in Fig. 8, the ends of adjacent pairs being secured in the loops of each spring $a'$ and the other ends in the succeeding spring, thus bridging between springs, as shown in connection with the volute series seen in Fig. 7. The spring $e^2$ has its inner central portion elevated or projected radially beyond the lower springs. The spring $a'$ is constructed with two corresponding single or helical coils in each branch of its dual formation. My purpose in providing the two coils is that flexion which is transverse to the axes of the coils may, as indicated by line X, Fig. 11, be strictly radial of the wheel; that is, the action with one coil representing a fulcrum is counteracted or compensated for by the action of the opposing coil.

The desirable results to be obtained in the construction of a spring-wheel are, first, durability of the springs with flexion or elasticity of suitable degree in the direction of the wheel plane, and in addition to this it is very important that there should be lateral elasticity, that when the wheel is leaned, as when running in a curved track and the side of the tire thereby bearing upon the ground, the cushioning properties are still operative. This result I obtain by means of the outer springs, which, with either kind of inner or sub spring, will flex at the sides, and with the volute springs there is an additional flexing, the inner spring itself being capable of lateral movement, as shown in Fig. 4. Another feature belongs to my method of construction, in which articulation of the springs serves an important purpose; that is, it is essential to easy propulsion of the vehicle that adjustment should take place in the circumferential extent of the tire to compensate for the chord formed at the base of the wheel by depression. It will be observed that within the apex of the conical springs and the loops of springs $a'$ extra space is provided for movement to and from each other of the outer spring-sections. The covering of rubber is elastic, and the felt within has elongating and contracting properties to insure tension under the shortening by depression, as aforesaid. The jointing or articulation of the springs so as to admit of adjustment may, however, be dispensed with when the outer springs are constructed as I have shown in these examples, i. e., of serpentine or zigzag formation, as the latter will admit of elastic contraction or extension sufficient for the purpose. In Fig. 5 I have shown a section of an outer spring mounted with a plate $r$, in which the elongation and contraction of the connections are prevented, when a sliding or yielding movement of the bulging between springs is necessitated that the latter may have their proper radial action. This latter is designed as a modification of the outer metallic surface upon which the cloth or rubber rests, requiring less in thickness of the latter to form a smooth tread.

With the spring structure as a whole consisting of the inner springs and the outer or tread structure all qualities essential to easy riding are obtained. The flexion under pressure of the lateral portions of connections $e\ e'$ yield the cushioning qualities at the sides of the tire so very essential to easy riding under all circumstances.

With the upper springs as shown in Figs. 6 and 10, where the connections $e\ e'$ are so shaped as to have elastic prominence radially beyond the springs, the elasticity is independent of or supplemental to that of the sub-springs. By this construction, in addition to furnishing the desired lateral flexibility, a gradation of elasticity may be obtained that will adapt a tire to great disparity in the weights of riders.

In the formation of the spring, as shown in detail in Figs. 9 and 11, it is unnecessary that the outer springs shall be of separate material, as an outward conformation of an extension of the loops $i^2$ may be such as to serve the purpose, though not so desirable.

While I have shown and described in the present example provision for adjustment, i. e., longitudinal contraction or extension between each two adjacent springs, such close adherence to the principle is not essential, for if such means for adjustment of the springs to or from each other is provided as will compensate for the difference between the length of the chord when the tire is depressed or flattened under the rider's weight and the complemental arc of such chord it is sufficient.

Having thus fully described my said invention, what I claim is—

1. In a vehicle-wheel and in combination with the rim thereof, a tire embracing in its structure a circumferential succession or series of coiled springs having their lines of flexion or longitudinal axes radial, a peripheral distinctive part of hard material that so unites said springs as to permit, when a portion of the structure is compressed, automatic shortening of the outer circumference of said tire, and a rubber or other elastic casing or cover.

2. In a vehicle-wheel and in combination with the rim thereof, a tire, embracing in its structure a series of radially-flexing coiled springs a separate peripheral portion of hard material which so unites springs that automatic shortening of the circumferential extent of the outer surface of the tire may occur under compression, a padding of soft material surmounting the metallic or hard portions, and an inclosing casing or covering of rubber or other elastic material.

JOSEPH RIDGE.

Witnesses:
ERNEST H. KOENIG,
MINNIE A. MORRIS.